Jan. 13, 1959  H. C. STEVENS ET AL  2,868,580
CARGO RELEASE HOOK

Filed March 31, 1955  3 Sheets-Sheet 1

Inventors
Howard C. Stevens
John E. Minty

Jan. 13, 1959
H. C. STEVENS ET AL
2,868,580
CARGO RELEASE HOOK
Filed March 31, 1955
3 Sheets-Sheet 2
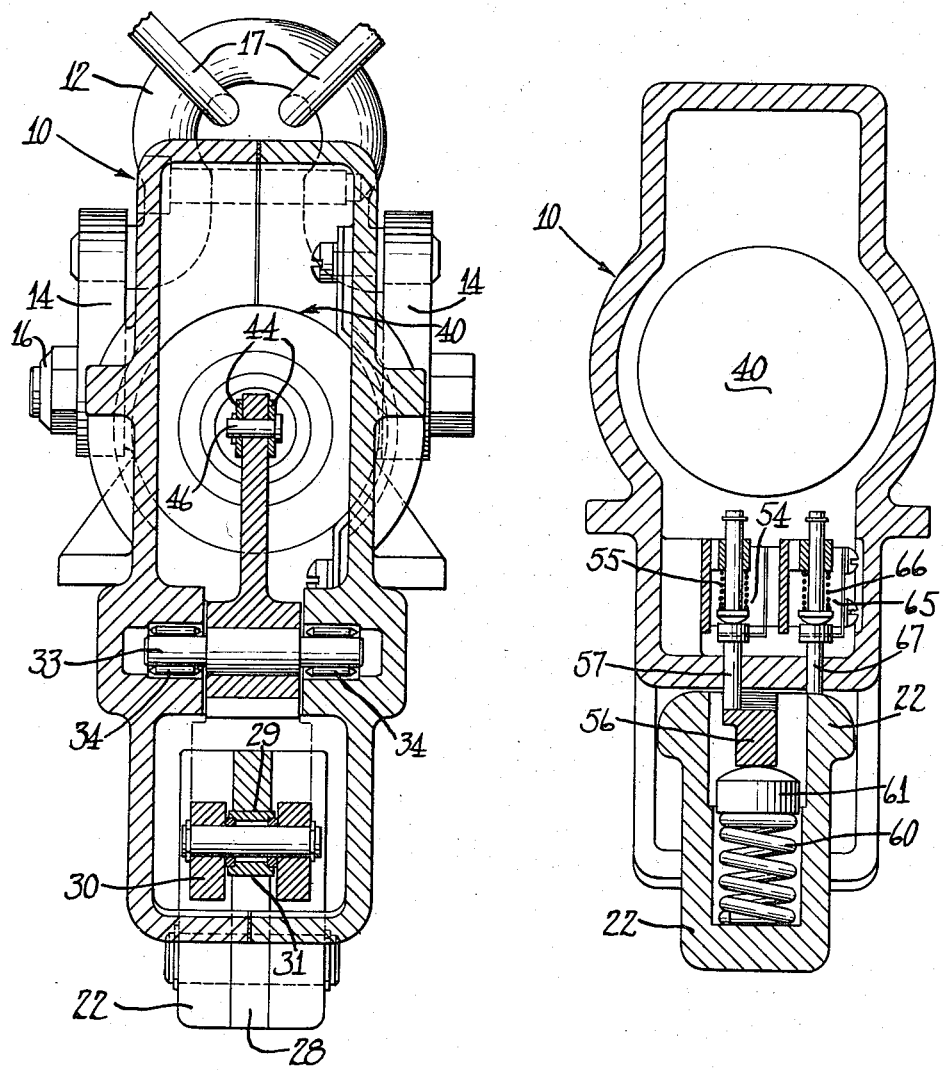
Inventors
Howard C. Stevens
John E. Minty Jan. 13, 1959    H. C. STEVENS ET AL    2,868,580
CARGO RELEASE HOOK
Filed March 31, 1955    3 Sheets-Sheet 3
Fig. 4
Fig. 5
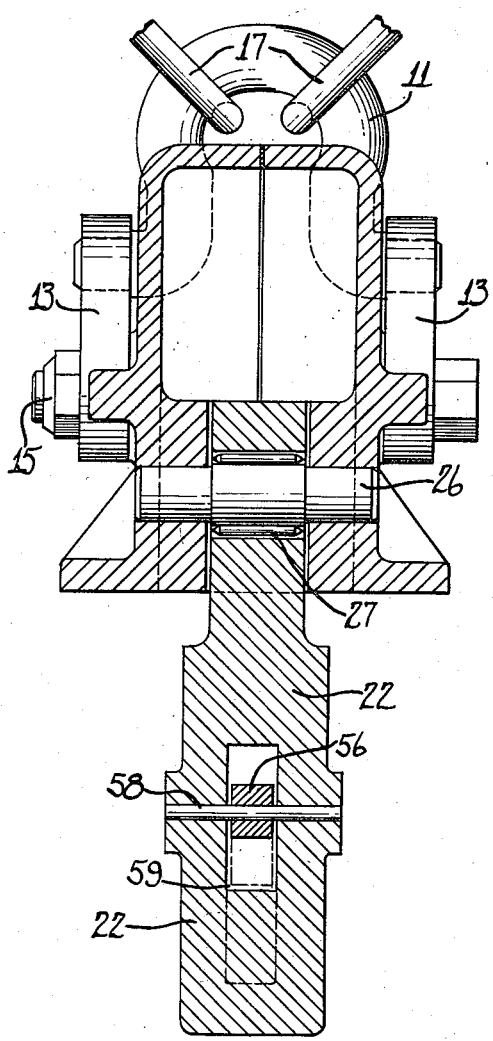
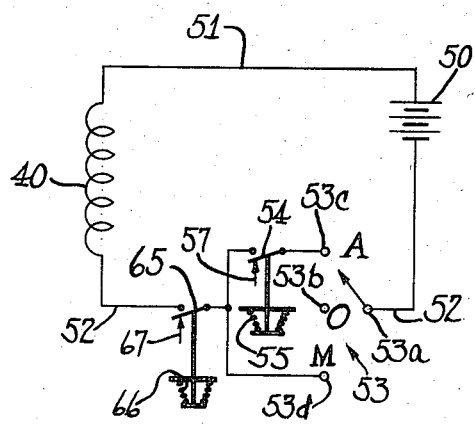
Inventors
Howard C. Stevens
John E. Minty
Attys

United States Patent Office 2,868,580
Patented Jan. 13, 1959

2,868,580

CARGO RELEASE HOOK

Howard C. Stevens and John E. Minty, Muskegon, Mich., assignors to Manning, Maxwell & Moore, Inc., Muskegon, Mich., a corporation of New Jersey Application March 31, 1955, Serial No. 498,351

8 Claims. (Cl. 294—83)

The present invention relates to hooks and the like for suspending loads from an overhead crane, aircraft, or other similar support. More particularly, the present invention is concerned with the provision of a cargo hook capable of supporting a load held by a plurality of lines and which will automatically release such lines when the cargo or load has been deposited on the ground and hence the weight of such cargo has been removed from the hook.

Although cargo hooks have been known and utilized for centuries, to our knowledge none of the hooks heretofore used have provided completely satisfactory cargo control. The cargo hook of the present invention provides an extremely compact and efficient structure by which a cargo or the like may be supported in a cargo sling, and which may be released either automatically upon depositing the cargo on a support and hence relieving the load from the hook, or manually from the ground, or manually from above. Actuation of the hook release is accomplished through actuation of a release solenoid responsive to energization by manual switch or a load sensitive switch. In the preferred form of the present invention such solenoid actuation releases a trip dog permitting one confiing wall of the cargo hook to swing open. Through the use of the above mentioned dog construction, manual release of the hook is simply accomplished by attachment of a remote control push-pull cable actuator to the dog, as well as by providing a directly mounted hand knob to the dog.

As a result of application of the release controls to a single control element or dog great diversification of operation is provided in a simple and extremely compact manner. This direct, simplified, control is rendered adequate, even with unusually heavy loads applied directly to the releasable confining wall of the cargo hook, through the use of an anti-friction dog surface and, additionally, through the provision of a center of pivotal movement for the releasable confining wall which minimizes the lever arm provided by the load on the confining wall relative to its pivot.

It is, accordingly, an object of the present invention to provide a cargo hook to automatically release the load when the load touches the ground or like support.

Another object of the present invention is to provide a novel cargo hook capable of automatic release upon external load support and at the same time susceptible of easy, independent, manual actuation from a point immediately adjacent the hook or, alternatively, remote therefrom.

Still a further object of the present invention is to provide a cargo hook having a substantially horizontal load carrying portion pivotally mounted about a point above and laterally within the horizontal width of said load carrying portion.

Still a further object of the present invention is to provide a compact, efficient and yet simple automatic cargo release hook.

A feature of the present invention resides in the provision of alternate, completely independent, means for unloading the cargo hook by actuation of a single member.

Another feature of the present invention is the provision of an adjustable automatic cargo release control whereby said cargo hook may be adjusted to release the lines holding the cargo thereon automatically upon removal of the load thereon above a predetermined selected value.

Another feature of the invention is the provision of a cargo release hook ordinarily operated in a fully automatic manner but having associated therewith manual actuation means capable of overriding the automatic release mechanism for manually releasing said hook under emergency conditions.

Still a further object of the present invention is to provide an improved cargo hook for use with a plurality of cargo sling lines or the like.

Still other and further objects and features of the present invention will be at once understood by those skilled in the art from a consideration of the attached drawings wherein a preferred form of the invention is shown by way of illustration only, and wherein:

Figure 2 is a cross-sectional view of the hook of the present invention taken along the line II—II of Figure 1 and showing further details of the sear mechanism thereof;

Figure 3 is a side elevational view in cross-section taken along the line III—III of Figure 1;

Figure 4 is a cross-sectional view taken along the line IV—IV of Figure 1; and

Figure 5 is a schematic diagram of a control circuit arranged in accordance with the present invention.

As shown in the drawings:

Figure 1:
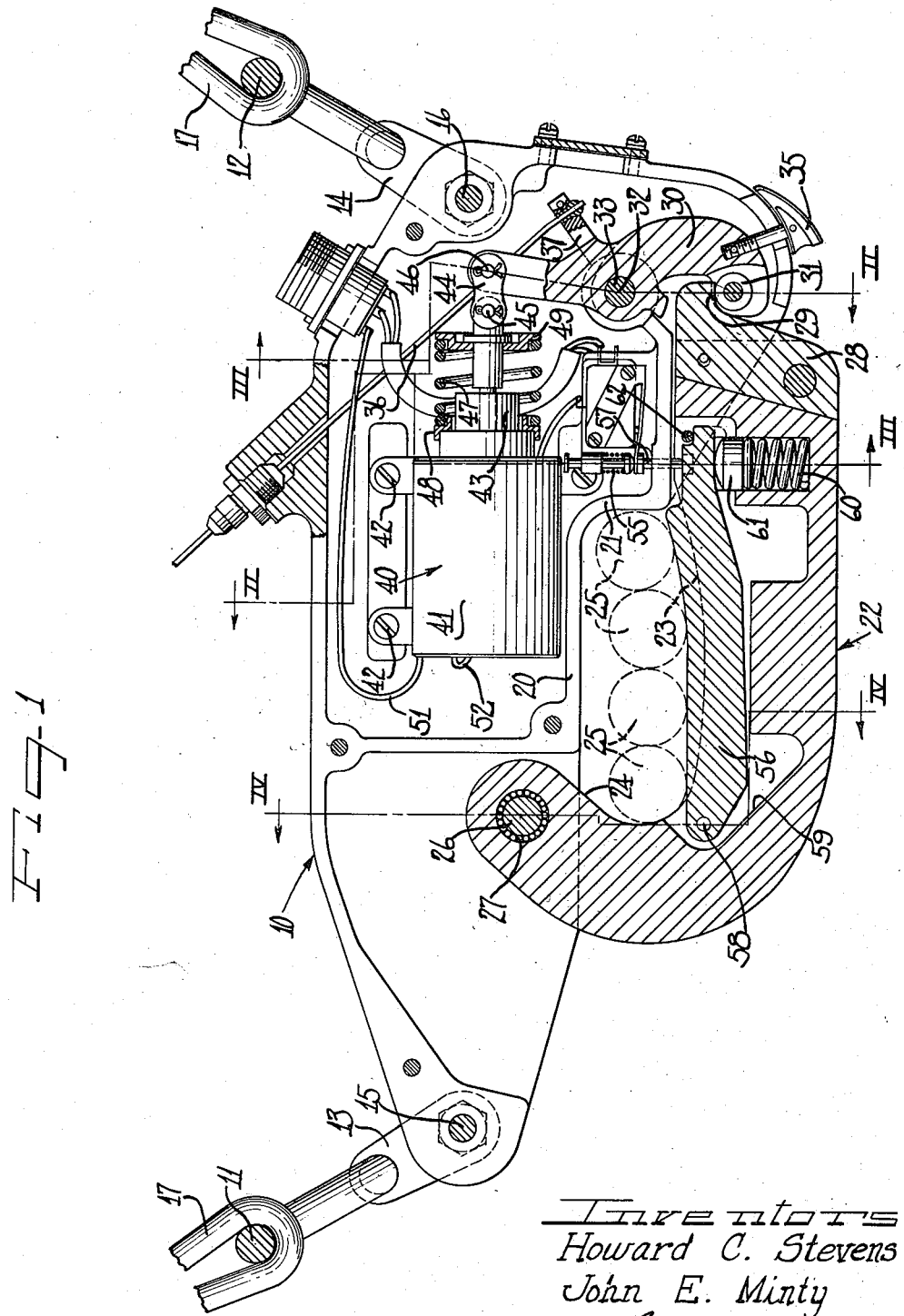
Figure 1 is an elevational view of a cargo hook constructed in accordance with the present invention.

As may be seen from a consideration of Figure 1, the cargo hook of the present invention comprises a housing or body generally indicated at 10 provided with a pair of supporting eyes 11 and 12 respectively connected thereto through links 13 and 14 pivotally mounted at bolts 15 and 16. The eyes 11 and 12 are preferably supported by divergent cables 17 as shown in Figures 1, 2 and 4 and which are secured in any conventional fashion to an overhead support, such as an aircraft, overhead crane, or the like. While four cables 17 have been illustrated, it will be understood that the cargo hook of the present invention may be utilized with only two such cables secured to the eyes 11 and 12, or alternatively that only a single eye may be provided at the top of the housing 10 along a vertical center line of the hook. The example illustrated is, however, preferred, and the discussion following will be directed, for the most part, to the form shown.

The housing 10 is provided with a cargo sling or line-retaining pocket formed by the walls 20 and 21. The pocket is closed by means of a pivotally mounted hook or confining wall portion generally indicated at 22 and provided with walls 23 and 24 which complete a generally rectangular loop within which a plurality, preferably four, sling lines 25 may be positioned as indicated in dotted lines. The hook portion 22 is pivoted at 26, preferably through the anti-friction needle bearing 27 and carries at its remote end a hardened latch member 28 having a projecting lip or tooth 29. The hook member 22 is retained in latched position as shown in Figure 1 by means of a dog 30 having an anti-friction roller 31 positioned immediately under and in supporting engagement with the lip 29. The dog 30 is pivotally mounted about the axis 32 by bolt 33 supported in anti-friction needle bearings 34 as viewed in Figure 2 and will, upon rotation thereof in the counterclockwise direction as viewed in Figure 1, release the latch lip 29 to permit pivotal movement of the hook member 22 in the clockwise direction to release the lines 25.

As shown in Figure 1, the pivot 26 for the hook member 22 is positioned over and generally within the lateral confines of the area defined by the walls 20, 21, 23 and 24. In this manner, a maximum portion of the weight applied to the hook member 22 by the lines 25 is carried by the pivot point 26 rather than the latch lip 29. In devices of the type illustrated, wherein a plurality of lines are to be utilized, it is preferred that the pivot point 26 be slightly over the endmost line 25 such that the lever arm or line of action of that line will be such as to cause an opening of the hook member 22 upon release of the latch lip 29, by only a slight margin. Positioning of the pivot point 26 on a vertical line to the right of a vertical center line passing through the left-handmost line 25 is not preferred since the action of that line, taken alone, would provide a force tending to close the hook element 22, moving it in the counterclockwise direction. Such action would, while ordinarily prevented as a result of the load placed upon the hook member by the remaining lines, not cause difficulty in operation, nevertheless in rare instances it might prevent satisfactory release of all of the lines from the cargo hook.

As may be seen, the latch lip 29 is positioned at a point remote from the pivot 26. In the structure herein set forth, the position of the lip 29 is at the extreme right hand of the housing 10 and it is preferred that the lip 29 be positioned as far to the right as permissible in order to minimize the load applied to the roller 31, thereby lessening the frictional load against unlatching action.

The hook releasing or unlatching action is accomplished in the structure illustrated by pivoting the dog 30 in a counterclockwise direction about the pivot axis 32. This is accomplished in several ways. In the first place, the manual actuation of the dog 30 may be obtained through manual actuation of the knob 35 when the hook is adjacent the ground or otherwise within reach of an operator. Secondly, the dog 30 may be manually actuated from a remote position by means of the reciproacting cable 36 attached to lever arm 37 forming a part of the sear 30. The cable 36 may, of course, be extended to substantially any remote position whereby actuation of the dog 30 may be accomplished in the absence of, or failure of, electrical current for actuation of the solenoid to be described below.

Electrical actuation of the latch is accomplished by means of energization of the solenoid 40. As may be seen from Figure 1, the housing 41 of the solenoid 40 is secured to the housing 10 of the cargo hook by conventional means such as screws 42 while the plunger 43 is pivotally secured to the dog 30 by means of a pair of links 44 and pins 45, 46. The solenoid plunger 43 is ordinarily maintained in the extreme right hand position shown in Figure 1, which position corresponds to the de-energized position, by means of a spring 47 compressed between plates 48 and 49 secured in turn for movement with the housing 40 and the plunger 43 respectively. The spring 47 provides the biasing force which maintains the dog 30 in hook-latching condition at all times when the solenoid 40 is not energized and manual pressure is not applied at either the button 35 or the Bowden wire 36.

Energization of the solenoid 40 to operate the dog 30 in the counterclockwise direction and thereby release the hook 22 is preferably accomplished by controls permitting either manual or automatic control. As an example of the control system which has proven very effective, attention is drawn to Figure 5 in which a preferred control circuit is diagrammatically illustrated. As may there be seen, the solenoid 40 is connected to a source of power 50 by means of conductors 51 and 52. A control switch generally indicated at 53 is provided at the point of intended operation and is marked with three positions indicated as A, O and M in the drawings, but which may have such respective designations as "automatic release," "loading position" and "manual release."

In order to release the line 25 automatically upon depositing the load upon a support, such as the ground, a trigger actuated switch 54 is provided. The switch 54 is normally biased into the switch-open position by a spring 55 which supplies a rather nominal force sufficient to maintain switch contacts in open condition in the absence of external force applications. The switch 55 is actuated into closed position by means of a trigger 56 which actuates a reciprocating plunger 57 when the load on the hook 22 is released.

As may be seen from Figures 1 and 3, the trigger member 56 is pivotally mounted at 58 to the hook 22, in a longitudinally extending cavity 59 thereof. A spring 60 acts upwardly against the trigger 56 through a plunger 61 to actuate the plunger 57 in the absence of a downwardly acting load positioned on the trigger 56. A stop pin 62 prevents complete pivotal freedom of the trigger 56 thereby preventing disassembly of the spring 60 therefrom. With the latch parts positioned as shown in Figure 1, the trigger member 56 is in position to force the plunger 57 upwardly and accordingly the switch 54 is closed. The lifting of a load through the cables 25 would automatically move the trigger member downwardly or in the clockwise direction around the pivot 58 to permit the spring 55 to open the circuit of the solenoid 40. In ordinary practice it is desired that the spring 60 be of a strength to force the trigger 56 upwardly into switch closing condition with drop of the load on the trigger 56 to a value somewhat below 100 pounds. This permits automatic energization of the solenoid with corresponding unlatching operation as soon as the load held by the lines 25 is set upon the ground, in spite of the fact that the lines themselves may weigh a substantial number of pounds. It will, of course, be appreciated that an adjustable spring 60 may be provided without departing from the scope of the present invention.

With a system utilizing a selector switch 53 and the automatic switch 54 above described, the operator would position the switch 53 with the contacts 53a and 53b closed when the hook is to be loaded. This provides a completely open circuit in which the solenoid cannot be energized no matter what the position of the trigger 56 may be. Upon lifting the load the operator switches the switch 53 to close contacts 53a and 53c by moving the switch into the "A" or "automatic release" position. With the switch in this position, the hook will automatically open as soon as the load is placed on a support, thereby releasing the load supporting lines. With the hook thus released, the solenoid 40 will still be energized, however, and in order to prevent the solenoid from overheating and possibly burning out, a further burn-out-prevention switch 65 is provided in series with the switch 54.

The burn-out prevention switch 65 is similar to switch 54 and is normally biased into the open position by means of spring 66 and is urged into the closed position by plunger 67 which contacts the outside surface of the hook 22 and maintains the plunger 67 in its upward, switch closing, condition at all times when the hook 22 is in a latched condition. Thus, with the hook 22 maintained in latched condition by the dog 30, and with a load applied to the trigger 56, the switch 65 will be closed and the switch 54 will be open. With release of the load the switch 54 will close, energizing the solenoid 40 which will immediately unlatch the hook 22 releasing the lines 25. With unlatching of the hook, however, the switch plunger 67 will immediately drop downwardly permitting the switch 65 to open thereby de-energizing the solenoid 40 and preventing an overheating condition from occurring.

Should the operator desire to retain manual control over the load and prevent its automatic release, he may do so by moving the switch 53 to the "manual release" position in which the contacts 53a and 53d are closed and the automatic switch 54 is by-passed. It will be noted, however, that the switch 65 is still in the circuit in series with the switch 53 so that if the operator inadvertently leaves the switch 53 in the "manual release" position the solenoid will not overheat after the hook 22 has become delatched.

In view of the provision of a hook 22 with a pivot positioned substantially within the confines of the load carrying area, and by providing the hook retaining dog 30 at a position substantially removed from the hook pivot and also from the load carrying portion of the hook, the load on the sear is reduced to an absolute minimum. Further, through the use of the roller 31, the coefficient of friction on the dog 30 is reduced to an absolute minimum and accordingly the force required to unlatch the hook 22, even with a heavy load positioned thereon, is well within the range permitting successful actuation by a conventional solenoid 40. Accordingly, extremely rapid, and at the same time easy, operation is provided permitting not only the use of simple, conventional solenoids for electrical operation but also permitting relatively simple manual actuation.

It will thus be seen that we have provided a novel and substantially improved cargo release hook of great versatility. It will be appreciated by those skilled in the art that variations and modifications may be made to the particular embodiment shown in the drawings without departing from the scope of the novel concepts of the instant invention and it is, therefore, our intention that the scope of the present invention be limited solely by that of the hereinafter appended claims.

We claim as our invention:

1. A load carrying hook comprising a body member, a hook member pivotally secured by one end to said body member for supporting said load on a portion of said hook member, latch means on said body and said hook for maintaining said hook in load supporting position, said pivotal connection between said hook and said body being positioned above and within the horizontal confines of said portion, and said latch means being positioned at a point at the opposite end of said hook from said pivot and substantially removed from said pivot and said portion whereby the load on said latch is minimized.

2. A load carrying hook comprising a body member, a hook member pivotally secured by one end to said body member for supporting said load on a portion of said hook member, latch means on said body and said hook for maintaining said hook in load supporting position, said pivotal connection between said hook and said body being positioned above and within the horizontal confines of said portion, and said latch means being positioned at a point at the opposite end of said hook from said pivot and substantially removed from said pivot and said portion whereby the load on said latch is minimized, electrical solenoid means for actuating said latch to release said hook, and means responsive to a substantial reduction in the weight of the load on said hook controlling energization of said solenoid.

3. A load carrying hook comprising a body member, a hook member pivotally secured by one end to said body member for supporting said load on a portion of said hook member, latch means on said body and said hook for maintaining said hook in load supporting position, said pivotal connection between said hook and said body being positioned above and within the horizontal confines of said portion, and said latch means being positioned at a point at the opposite end of said hook from said pivot and substantially removed from said pivot and said portion whereby the load on said latch is minimized, electrical solenoid means for actuating said latch to release said hook, switch means responsive to a substantial reduction in the load on said hook for controlling the energization of said solenoid, and further switch means responsive to the position of said hook, and actuated when said hook has been delatched to de-energize said solenoid whereby said solenoid is maintained in de-energized condition when said hook is in unlatched condition.

4. A load carrying hook comprising a body member, a hook member pivotally secured to said body member for supporting said load on a portion of said hook member, latch means on said body and said hook for maintaining said hook in latched, load supporting position, electrical solenoid means for actuating said latch to release said hook when energized, and switch means responsive to a substantial reduction in the weight of the load on said hook for controlling the energization of said solenoid, said switch means having actuating means forming a portion of said hook member and mounted on the upper surface of said hook for positioning immediately under said load and biased upwardly toward switch operating position and normally maintained in a downward position by the load on said hook portion, whereby reduction of said load will permit upward movement of said actuating means to actuate said switch and control the energization of said solenoid to delatch said hook.

5. A load carrying hook comprising a body member, a hook member pivotally secured to said body member for supporting said load on a portion of said hook member, latch means on said body and said hook for maintaining said hook in latched, load supporting position, electrical solenoid means for actuating said latch to release said hook when energized, and switch means responsive to a substantial reduction in the weight of the load on said hook for controlling the energization of said solenoid, said switch means having actuating means forming a portion of said hook member and mounted on the upper surface of said hook for positioning immediately under said load and biased upwardly toward switch operating position and normally maintained in a downward position by the load on said hook portion, whereby reduction of said load will permit upward movement of said actuating means to actuate said switch and control the energization of said solenoid to delatch said hook, and solenoid burn-out prevention means comprising a second switch positioned in series with said solenoid having sensing means associated therewith and operated to close said second switch only when said hook is latched whereby said second switch is opened immediately upon delatching said hook to thereby prevent overheating of said solenoid subsequent to latch actuation.

6. A load carrying hook comprising a body member, a hook member pivotally secured to said body member for supporting said load on a portion of said hook member, latch means on said body and said hook for maintaining said hook in latched, load supporting position, solenoid means for actuating said latch to release said hook, and trigger means forming a portion of the upper surface of said hook and defining a load supporting surface of said hook, said last named means being normally biased upward and having switch means associated therewith for controlling the energization of said solenoid means when in said upward condition, whereby said latch will be retained in latched condition only during such time as the load rests on said trigger.

7. A load carrying hook comprising a body member, a hook member pivotally secured to said body member for supporting said load on a portion of said hook member, latch means on said body and said hook for maintaining said hook in a latched load supporting position, solenoid means for actuating said latch to release said hook, and switch actuating means forming a portion of the hook, means normally biasing said switch actuating means upwardly against the downward force of the load on said hook member, said switch actuating means having switch means associated therewith for controlling the energization of said solenoid means when said switch actuating means is in said upward condition, whereby said latch will be retained in the latched condition only during such time as the load rests on said hook member, 8. A load carrying hook comprising a body member, a hook member pivotally secured to said body member for supporting said load on a portion of said hook member, latch means on said body and said hook for maintaining said hook in latched load supporting position, electrical motor means for actuating said latch to release said hook when energized, and switch means responsive to a substantial reduction in the weight of the load on said hook for controlling the energization of said electric motor, said switch means having actuating means forming a portion of said hook member for downward movement by said load, and said actuating means being biased upwardly toward switch operating position load on said hook member whereby substantial reduction of said load will permit upward movement of said actuating means to actuate said hook and control the energization of said electric motor to delatch said hook.

References Cited in the file of this patent

UNITED STATES PATENTS

| | | |
|---|---|---|
| 2,490,558 | Sullivan | Dec. 6, 1949 |
| 2,604,353 | Pierson et al. | July 22, 1952 |
| 2,650,127 | Carlson | Aug. 25, 1953 |
| 2,667,376 | Schlachter | Jan. 26, 1954 |